(12) United States Patent
Bjarno

(10) Patent No.: US 9,382,079 B2
(45) Date of Patent: *Jul. 5, 2016

(54) CONVEYOR FOR TRANSPORTING POWDER, AND A METHOD FOR CONVEYING POWDER

(71) Applicant: ALSTOM Technology Ltd, Baden (CH)

(72) Inventor: Odd E. Bjarno, Oslo (NO)

(73) Assignee: ALSTOM TECHNOLOGY LTD, Baden (CH)

( * ) Notice: Subject to any disclaimer, the term of this patent is extended or adjusted under 35 U.S.C. 154(b) by 0 days.

This patent is subject to a terminal disclaimer.

(21) Appl. No.: 14/280,858

(22) Filed: May 19, 2014

(65) Prior Publication Data

US 2014/0255109 A1   Sep. 11, 2014

Related U.S. Application Data

(62) Division of application No. 12/463,755, filed on May 11, 2009, now Pat. No. 8,764,350.

(60) Provisional application No. 61/059,031, filed on Jun. 5, 2008.

(51) Int. Cl.
*B65G 53/18* (2006.01)
*B65G 53/40* (2006.01)
(Continued)

(52) U.S. Cl.
CPC .............. *B65G 53/40* (2013.01); *B65G 53/16* (2013.01); *B65G 53/20* (2013.01); *B65G 53/60* (2013.01); *C25C 3/14* (2013.01)

(58) Field of Classification Search
USPC .................. 406/89, 168, 173, 197; 414/291; 209/147
See application file for complete search history.

(56) References Cited

U.S. PATENT DOCUMENTS 3,780,497 A   12/1973   Muhlrad
3,809,438 A   5/1974   Hubbard
(Continued)

FOREIGN PATENT DOCUMENTS

CN   2739149 Y   11/2005
EG   26796   9/2014
(Continued)

OTHER PUBLICATIONS

PCT International Search Report and the Written Opinion of the International Searching Authority dated Sep. 21, 2009 (PCT/EP2009/056882).

(Continued)

*Primary Examiner* — Joseph Dillon, Jr.
(74) *Attorney, Agent, or Firm* — Buchanan Ingersoll & Rooney PC

(57) ABSTRACT

A conveyor (10) for transporting powder from an inlet point (14) to at least one discharge point (20) comprises a fluidized bed transport space (12) and a fluidization gas supply space (16), the fluidized bed transport space (12) being separated from the fluidization gas supply space (16) by a gas permeable wall (18); a gas outlet (22) for removing fluidization gas from the transport duct (12); means (24) for separating dust from the removed fluidization gas; and means (26) for returning the separated dust to the powder proximate the discharge point (20). In a preferred embodiment, the separated fines dust is returned to, and homogenized into, the powder in a lower portion of a cyclone, which is located at the discharge point.

6 Claims, 3 Drawing Sheets

Figure 1:
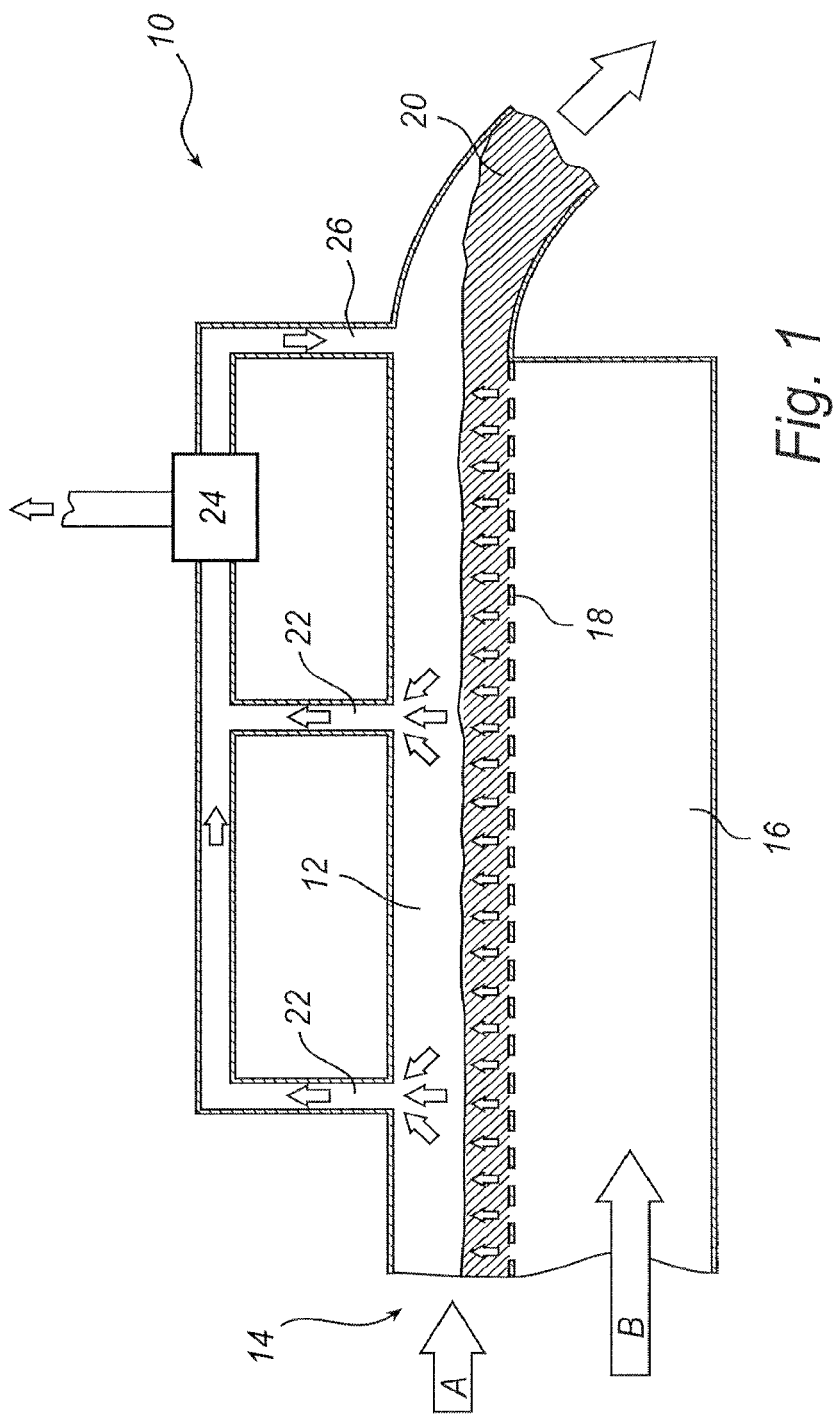

(51) Int. Cl.
*B65G 53/20* (2006.01)
*B65G 53/60* (2006.01)
*C25C 3/14* (2006.01)
*B65G 53/16* (2006.01)

(56) References Cited

U.S. PATENT DOCUMENTS

| | | | |
|---|---|---|---|
| 4,016,053 | A | 4/1977 | Stankovich et al. |
| 4,147,392 | A | 4/1979 | Fuss |
| 4,229,285 | A | 10/1980 | Wild |
| 4,299,683 | A | 11/1981 | Adorno et al. |
| 4,305,210 | A | 12/1981 | Christensen et al. |
| 4,411,674 | A | 10/1983 | Forgac |
| 4,630,975 | A | 12/1986 | Becker |
| 4,659,263 | A | 4/1987 | Hanrot et al. |
| 4,671,867 | A | 6/1987 | Battie et al. |
| 4,840,727 | A | 6/1989 | Humphrey |
| 5,294,217 | A | 3/1994 | Talacko et al. |
| 5,360,297 | A | 11/1994 | Enstad et al. |
| 5,478,172 | A | 12/1995 | Oura et al. |
| 5,547,331 | A | 8/1996 | Podd et al. |
| 6,190,235 | B1 | 2/2001 | Csabal et al. |
| 7,407,346 | B2 | 8/2008 | McConnell |
| 8,833,397 | B2 * | 9/2014 | Hu et al. ............ 138/44 |
| 2013/0041073 | A1 | 2/2013 | Villard et al. |
| 2014/0323614 | A1 | 10/2014 | Villard et al. |

FOREIGN PATENT DOCUMENTS

| | | |
|---|---|---|
| EP | 1 086 035 | 3/2001 |
| EP | 2 185 460 A0 | 5/2010 |
| FR | 2 534 891 | 4/1984 |
| FR | 2778393 A1 | 5/1998 |
| FR | 2788393 | 11/1999 |
| GB | 891648 | 3/1962 |
| JP | 56023123 | 3/1981 |
| JP | A-60-67325 | 4/1985 |
| NZ | 528024 | 6/2005 |
| RU | 2 226 492 | 4/2004 |
| SU | 737326 | 5/1980 |
| SU | 1303518 | 10/1984 |
| SU | 1557024 A2 | 4/1990 |
| WO | WO 93/00050 | 1/1993 |
| WO | WO 96/18076 | 6/1996 |
| WO | WO 02/072456 A1 | 9/2002 |

OTHER PUBLICATIONS

Examination Report from the Intellectual Property Office of New Zealand, NZ Application 589229, dated Dec. 9, 2011.
Examination Report from the Canadian Intellectual Property Office, CA Application 2725942, dated Feb. 21, 2012.
Official Action received from the Patent Office of the Russian Federation dated Apr. 4, 2013 for Application 2010154026.
Oct. 9, 2012 Notice of Opposition issued in European Application No. 09757558.3.
Jean-Pascal Hanrot, "Multipoint Feeding of Hoppers, Mounted on Aluminium Smelter Pots, by means of Potential Fluidization Piping," Light Metals, 1986, pp. 103-109.
"Aluminium Smelter Technology. A Pure and Applied Approach," 2nd Edition, par B.J. Welch, 3870171626, 1988, 3 pages.
Brochure Aluminium Technologie par Aluminium Pechiney, 1996, 20 pages.
Support de presentation, Alceng Gardanne, Raw Materials Handling & Storage Engineering Solutions, Sep. 2006, Alcan Inc., 14 pages.
Aug. 31, 2012 Chinese Office Action issued in Chinese Application No. 200980121366.1.
Mar. 13, 2014 Decision on Grant issued in Russian Application No. 2010154026/11(078124).
Apr. 18, 2012 Letter from Egyptian practitioner providing translation of Egyptian examiner's remarks in Egyptian Patent Application No. 2020/2010.

* cited by examiner

CONVEYOR FOR TRANSPORTING POWDER, AND A METHOD FOR CONVEYING POWDER

CROSS-REFERENCE TO RELATED APPLICATION

This application is a divisional of U.S. application Ser. No. 12/463,755, filed on May 11, 2009, which claims the benefit under 35 U.S.C. §119(e) of U.S. Provisional Patent Application Ser. No 61/059,031, filed Jun. 5, 2008. The disclosure of the prior applications is hereby incorporated by reference in their entirety.

FIELD OF THE INVENTION

The present invention relates to a method for conveying powder in a fluidized bed transport duct, from an inlet point to at least one discharge point. The invention also relates to a conveyor for transporting powder.

BACKGROUND OF THE INVENTION

U.S. Pat. No. 4,016,053 discloses a system for distributing alumina to smelting pots. The system is based on air-activated gravity conveyors, i.e. fluidized bed conveyors, in which the alumina is fluidized by a vertical, upwardly directed air stream. Gravity thereby makes the alumina flow like a liquid, via fluidized bed transport ducts, to the smelting pots.

The air used for fluidizing the alumina in the conveyors is allowed to exit from the transport ducts, and is transported, together with the reduction process flue gases from the smelting pots, to a gas cleaning plant, which generally comprises filters, e.g. of bag filter type.

The gas cleaning plant consumes a lot of energy, partly because of the high pressure difference required to transport the dust laden gas through the bag filters.

SUMMARY OF THE INVENTION

It is an object of the present invention to solve, or at least mitigate, parts or all of the above mentioned problems. To this end, there is provided a method for conveying powder in a fluidized bed transport duct, from an inlet point to at least one discharge point, comprising feeding powder into the transport duct at the inlet point;

supplying gas to the transport duct, so as to fluidize the powder in the transport duct;

removing gas from the transport duct;

separating dust from the removed gas; and returning the separated dust to the powder proximate the discharge point.

By returning the separated dust to the powder proximate said discharge point, re-entrainment of the dust in the fluidization gas along the transport duct is avoided. The dust particles separated from the removed gas is normally the fines, i.e., fines dust particles having a particle size which is smaller than the average particle size of the powder being transported in the transport duct. The fines tend to become entrained from the body of the transported powder under the action of the fluidization gas. Separating the dust, i.e. the fines, from the gas removed from the transport duct, and returning the separated dust, i.e., the fines, to the bulk of the powder reduces the accumulation of fines in the removed fluidization gas and in the gas cleaning system, which in turn reduces the pressure drop over the filters in the gas cleaning plant.

In a preferred embodiment, the method further comprises fluidizing the powder proximate said discharge point, such that the returned separated dust is mixed into the powder, and such that the powder is homogenized. Homogenizing the powder increases the reliability and predictability of any downstream process making use of the powder, for example the smelting of the powder in an alumina reduction cell.

Preferably, the gas is removed from the transport duct adjacent to the discharge point. In this manner, it is easier to maintain a uniform distribution of particle sizes in the powder over time. This is particularly a benefit when the flow rate of powder through the transport duct varies as a function of time. Furthermore, it makes it easier to maintain a uniform distribution of particle sizes in the powder in distribution systems having multiple discharge points. Even further, air streams in the upper part of the fluidization bed transport duct will be directed towards the discharge point, which may speed up powder transport.

In one embodiment, the dust is separated from the gas in a cyclone. A cyclone offers a dust return rate to the discharge point that is relatively constant over time, since it requires very little periodic cleaning. This leads to a more predictable control of any downstream processes, e.g reduction of alumina in a reduction cell. Furthermore, a cyclone is inexpensive, particularly simple to maintain, and makes it possible to return and mix the separated dust, i.e., the fines, into the powder within one single device. Preferably, the separated dust is mixed back into the powder in a mixing region in a lower portion of the cyclone. This is a particularly compact and efficient embodiment. Even more preferred, the mixing region comprises a fluidized bed; in this manner, a particularly efficient mixing and homogenization of the powder is achievable.

Preferably, the powder is conveyed from the transport duct to the discharge point via the cyclone. This minimizes the re-entrainment of the separated dust, i.e., the fines, in the fluidization gas.

According to another aspect of the invention, there is provided a conveyor for transporting powder, such as alumina powder, from an inlet point to at least one discharge point, the conveyor comprising a fluidized bed transport duct and a fluidization gas supply space, the transport duct being separated from the fluidization gas supply space by a gas permeable wall; a gas outlet for removing fluidization gas from the transport duct; means for separating dust from the removed fluidization gas; and means for returning the separated dust to the powder proximate the discharge point. A conveyor of this type reduces the accumulation of small dust particles, i.e., fines, in the removed fluidization gas supply and in the gas cleaning system, which in turn reduces the pressure drop over the filters in the gas cleaning plant.

In a preferred embodiment, said means for separating dust from the removed fluidization gas comprises a cyclone, said cyclone having an inlet for dust laden gas; a first outlet for dust; and a second outlet for de-dusted gas, said inlet for dust laden gas being connected to said transport duct. A cyclone offers a dust return rate to the discharge point that is relatively constant over time, since it requires very little periodic cleaning. This leads to a more predictable control of any downstream processes, e.g. reduction of alumina in a reduction cell. Furthermore, a cyclone is inexpensive, particularly simple to maintain, and makes it possible to return and mix the removed dust, i.e., the fines, into the powder within one single device.

Preferably, said inlet for dust laden gas is connected to said transport duct adjacent to the discharge point. In this manner, it is easier to maintain a uniform distribution of particle sizes in the powder over time. This is particularly a benefit when the flow rate of powder through the transport duct varies as a function of time. Furthermore, it makes it easier to maintain a uniform distribution of particle sizes in the powder in distribution systems having multiple discharge points. Even further, air streams in the upper part of the fluidization bed transport duct will be directed towards the discharge point, which may speed up powder transport.

Preferably, a lower portion of the cyclone communicates with the transport duct, so as to allow a transfer of powder, such a s alumina powder, between the transport duct and the cyclone. This is a particularly compact arrangement for returning separated fines dust into the powder.

Preferably, said cyclone comprises a gas permeable wall, which separates the cyclone from a fluidization gas supply space, so as to allow fluidization of powder in said cyclone. This embodiment is particularly efficient for mixing and homogenizing the powder.

Preferably, said transport duct is connected to the discharge point via a lower portion of said cyclone. This minimizes the re-entrainment of fines in the fluidization gas.

BRIEF DESCRIPTION OF THE DRAWINGS

The above, as well as additional objects, features and advantages of the present invention, will be better understood through the following illustrative and non-limiting detailed description of a preferred embodiment of the present invention, with reference to the appended drawings, wherein:

FIG. 1 is a diagrammatic cross-sectional view of a first embodiment of a fluidized bed conveyor for transporting powder;

FIG. 2 is a diagrammatic view in perspective of a second embodiment of a fluidized bed conveyor for transporting powder;

FIG. 3 is a diagrammatic side view, in cross-section, of a fluidized bed conveyor for transporting powder; and FIG. 4 is a diagrammatic view, as seen in the section IV-IV, of the conveyor of FIG. 3.

DETAILED DESCRIPTION OF THE EXEMPLARY EMBODIMENTS

Aluminium is often produced using the Hall-Héroult process for electrolytic reduction of alumina, i.e. aluminium oxide, to aluminium. The process takes place in reduction cells, or smelting pots, in the presence of fluorine compounds. Often, aluminium production plants comprise large-scale distribution systems, capable of transporting pulverous aluminium oxide across distances of several hundreds of meters, from a centrally located alumina dispatch terminal, and distributing it to several hundreds of reduction cells.

Flue gases from reduction cells contain hydrogen fluoride and other aggressive components, and need to be cleaned in a scrubber. In order to re-use the fluorine, which is essential to the reduction process, the flue gases are scrubbed using primary, i.e. virgin or crude, alumina as a dry adsorbent in the scrubber. A dust collecting facility, which generally consists of a bag filter plant, separates dust from the scrubbed gas, and returns the dust to the alumina in the scrubber. The secondary alumina, i.e. the spent alumina that has been used for adsorbing hydrogen fluorine in the scrubber, and that comprises the returned dust from the dust collecting facility, is then distributed to the smelting pots for reduction to aluminium, thereby returning the fluorine to the process. The scrubber and the bag filter plant are located adjacent to each other, at a central location close to where primary alumina arrives at the aluminium production plant, e.g. by truck or by ship. In this manner, the primary alumina may be used in the scrubber, for cleaning the reduction process flue gases, before it is distributed to the smelting pots via the distribution system.

In a fluidized bed alumina distribution system, also the spent fluidization air that has been used for fluidizing the alumina powder in the conveyors is transported, together with the reduction process flue gases from the smelting pots, to the gas cleaning plant that contains the scrubber and the bag filters. In this manner, the spent fluidization air may be cleaned from any dust particles entrained with it, before the spent fluidization air is discharged into the ambient.

The primary alumina powder, i.e. the aluminium oxide that has not yet been spent in the scrubber, is a particulate matter, which comprises alumina particles ranging from relatively coarse particles, typically having a diameter of a few mm, to very fine particles of only a few microns or less. A typical primary alumina may, for example, consist mainly of particles in the range from 5 to 200 μm, with only a small fraction of large lumps up to several mm in size, and a small fraction of very small particles below 5 μm. The secondary alumina also comprises very fine fume particles, collected from the flue gas in the scrubber. Those fine fume particles, which may have diameters well below a micrometer, contain a relatively high level of fluorine compounds, and it is therefore desired that they be returned to the reduction process.

The spent fluidization air leaving the fluidized bed conveyor is laden with fine dust particles, hereinafter called fines, which may comprise fine alumina particles as well as fume particles. This air comprising fine dust particles, i.e., fines, which comprises a relative high level of fluorine compounds, is vented into gas ducts, which convey the extracted flue gas from the reduction cells to the gas cleaning plant. In the gas cleaning plant, the fines following the spent fluidization air is captured, and together with the captured fumes of the flue gas, it is returned with the secondary alumina back to the transportation and distribution system. In the distribution system, a significant portion of the fines will once again be entrained with the fluidization air, and transported to the gas cleaning plant. Fines hence tends to accumulate in the gas cleaning and secondary alumina distribution systems. This accumulation of fines in the systems tends to increase the pressure drop over the gas cleaning plant, thereby increasing the power required to transport the gas through the filters, since the filter bags will be clogged with fines. It may also lead to increased scaling, i.e. deposits of hard dust, in the gas cleaning system, and make the whole secondary alumina handling and transportation system, its operation, and its service a very dusty affair in general.

FIG. 1 schematically shows a first embodiment of a fluidized bed conveyor for transporting powder. The conveyor 10 comprises an upper transport space 12, which is adapted to receive pulverulent material at an inlet point 14. The powder feed direction into the transport space 12 at the inlet point 14 is indicated with an arrow A, and a level of powder is illustrated as a hatched area. The conveyor 10 further comprises a lower fluidization gas supply space 16, which is separated from the upper powder transport space 12 by a gas permeable wall 18. The lower fluidization gas supply space 16 is adapted to receive a flow of gas from a gas supply (not shown), e.g. a ventilation duct, a fan, a compressor, or a container for compressed gas.

Gas is fed into the fluidization gas supply space 16 in the direction indicated by arrow B, and is allowed to enter the powder transport space 12 via the gas permeable wall 18, such that it fluidizes the powder present in the powder transport space 12 with a vertical gas flow. Examples of suitable gas permeable walls are, e.g., textile fabrics, metal filament webs, perforated plastic or metal sheets, sintered metal sheets, or the like.

The fluidized powder will, under the force of gravity, float slowly along the transport space 12 to a discharge point 20, where powder is discharged from the conveyor 10 into a piece of downstream equipment (not shown).

Spent fluidization gas, i.e. gas that has passed from the fluidization gas supply space 16 and through the powder in the transport space 12, is vented out via spent fluidization gas outlets 22, which are arranged in an upper portion of the transport space 12. The spent fluidization gas will also entrain dust, mainly the smallest particles, i.e., the fines, from the powder inside the transport space 12, thereby removing parts of the smallest particle fractions from the transported powder. This means that the fraction of smaller particles in the transported powder will decrease with the transport distance from the powder inlet 14.

The fines laden spent fluidization gas is directed to a dust separating means 24, e.g. a cyclone or a filter, in which the fines dust is separated from the spent fluidization gas. The spent fluidization gas may thereafter be returned to the fluidization gas supply (not shown), be even further cleaned in additional gas cleaning plants, or be discharged elsewhere.

The separated fines, on the other hand, is returned to the transported powder via means 26, located proximate the discharge point 20, for returning the separated fines to the powder. This means that at the discharge point, the fraction of smaller particles in the transported powder will be restored.

The means 26 for returning the separated fines to the powder may be, e.g., a gravity fed pipe, a blower, a conveyor, an outlet of the dust separating means 24, a mixing device for mixing the separated fines with the powder, or any other means suitable for returning the separated fines to the powder. Preferably, the means 26 for returning the separated fines is located in connection with the discharge point 20. More preferably, the distance from the discharge point 20 to the means 26 for returning the separated fines to the transported powder is less than 20% of the distance from the powder inlet 14 to the discharge point 20, and still more preferably, the means 26 for returning the fines to the powder is located less than 1 m from the discharge point 20. By returning the fines relatively near the discharge point, the re-entrainment of fines with the fluidization gas, as the powder is transported from the means 26 for returning the fines to the powder to the discharge point 20, is reduced. In a preferred embodiment, the separated fines is returned to the powder at a location downstream of any fluidized bed portion of the transport duct 12, as is illustrated in FIG. 1, such that no fines is re-entrained with the fluidization gas in the transport duct 12.

Figure 2:
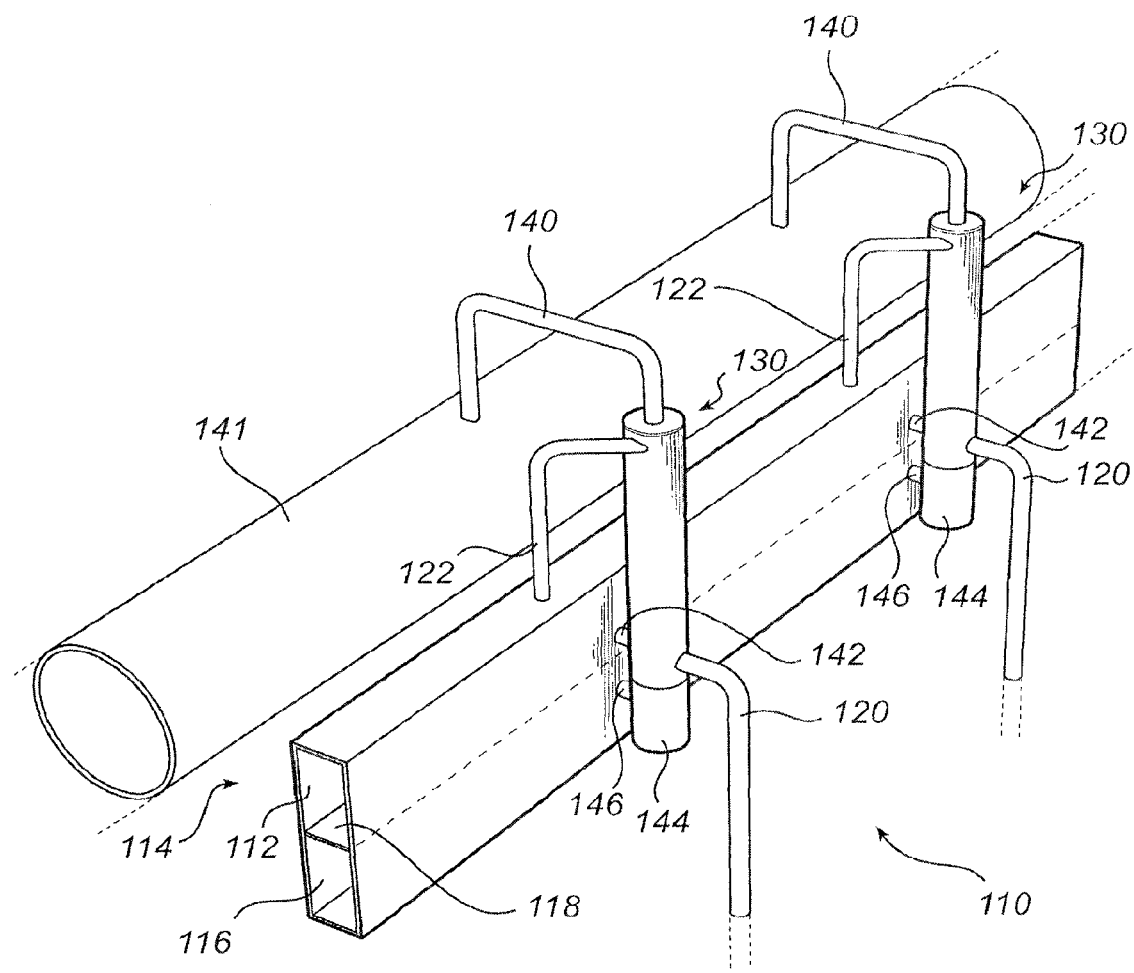

FIG. 2 illustrates a second embodiment of a fluidized bed powder conveyor. The conveyor 110, which is particularly well suited for conveying alumina powder, comprises a powder transport duct 112, and a fluidization air duct 116. The two ducts are separated by a fabric membrane 118, which is designed so as to allow air to penetrate the fabric membrane 118 from the fluidization air duct 116 to the powder transport duct 112. The conveyor 110 extends in an essentially horizontal direction, from a powder inlet point 114 to a plurality of powder discharge points 120, of which two are shown. Each discharge point 120 is a point of delivery of the powder to another device, such as a smelting pot, a hopper, a silo, another conveyor, or the like.

At each powder discharge point 120, spent fluidization air is allowed to exit the powder transport duct 112 via a spent fluidization air duct 122. The spent fluidisation air is forwarded through the spent fluidization air ducts 122 to cyclones 130, which are also located one at each of the powder discharge points 120. In each cyclone 130, dust, including the fines, is separated from the spent fluidization air, and the dust is returned to the transported alumina powder at the respective discharge point 120. The cleaned spent fluidization gas leaves the respective cyclone 130 via a respective duct 140 and is transported to the gas cleaning plant, not shown, together with gases from the smelting pots, via a central return duct 141.

Figure 3:
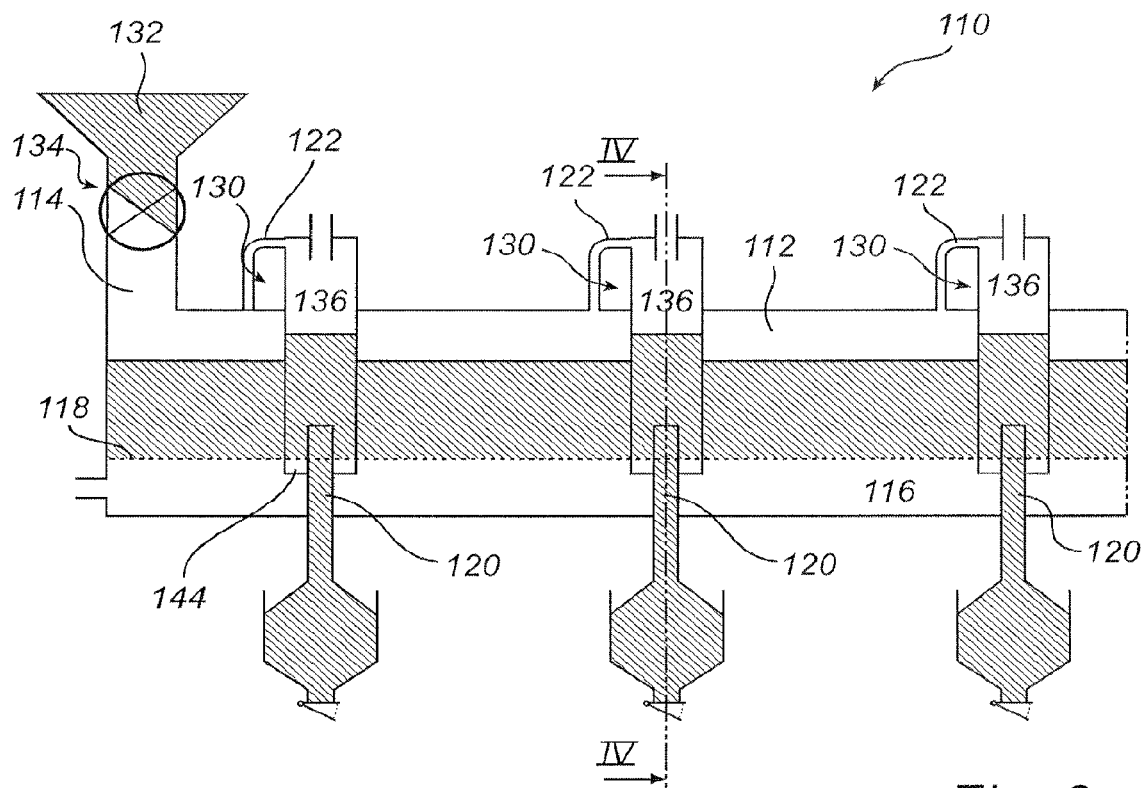

The cross-sectional view of FIG. 3 more clearly illustrates the function of the conveyor 110. Secondary alumina powder (hatched) from the gas cleaning plant is discharged into a feed hopper 132, from which it is fed to an inlet point 114 of the fluidized bed powder conveyor 110 via a rotary feeder 134. From the inlet point 114, the powder is conveyed via the transport duct 112 to a plurality of discharge points 120. Air from the fluidization air duct 116 keeps the powder fluidized along the transport duct 112, and is vented out from the transport duct 112 via the spent fluidization air ducts 122. At each discharge point 120, the spent fluidization air is separated from any fines, which may have been entrained with the air from the fluidized powder. The separation is made in an upper portion 136 of each cyclone 130.

Figure 4:
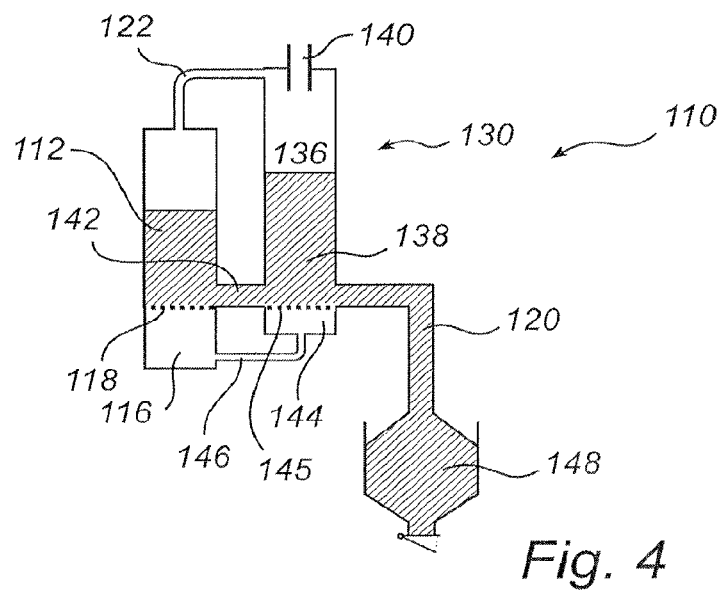

The cross-sectional view of FIG. 4 illustrates a discharge point 120 and a cyclone 130 in more detail. The spent fluidization air duct 122 is connected tangentially to the upper portion 136 of the cyclone 130, such that the spent fluidization air entering the cyclone 130 will form a vortex in the upper portion 136 of the cyclone 130. Due to centrifugal forces, dust, including most of the fines, will be separated from the spent fluidization air, and gravity will make the dust fall along the cyclone walls to a lower portion 138 of the cyclone 130. The spent fluidization air, now de-dusted, is discharged through a duct 140 for de-dusted air, which is connected to an upper central portion of the cyclone 130. The duct 140 for de-dusted gas is connected to a gas cleaning plant (not shown), preferably via the return ducts for flue gases from the smelting process in the reduction cells. In the gas cleaning plant, any remaining dust will be removed from the spent fluidization gas.

For efficient separation of dust from the spent fluidization air, the cyclone 130 preferably has an inner diameter within the range of 75-200 mm, and more preferred within the range of 100-150 mm, in the portion of the cyclone 130 where the separation takes place, i.e., in the upper portion 136.

A lower portion of the transport duct 112 is connected to the lower portion 138 of the cyclone 130 via an intermediate duct 142. Fluidized alumina powder in the transport duct 112 is allowed to flow via the intermediate duct 142 into the lower portion 138 of the cyclone 130, where it is fluidized by air from a cyclone fluidization air supply space 144 located below the cyclone 130. Preferably, the intermediate duct 142, which is also shown in FIG. 2, has a cross-section of at least 1000 $mm^2$, and more preferred at least 2000 $mm^2$, in order to permit a sufficient flow of alumina powder from the transport duct 112 into the cyclone 130.

The lower portion 138 of the cyclone 130 is, as illustrated in FIG. 4, separated from the cyclone fluidization air supply space 144 via an air permeable membrane 145, which may be similar to the air permeable membrane 118. The cyclone fluidization air supply space 144 receives fluidization air from the fluidization air duct 116 via a conduit 146, which is also shown in FIG. 2, and forwards the air to the lower portion 138 of the cyclone 130, so as to form a fluidized bed in the lower portion 138 of the cyclone 130. In the fluidized bed of the lower portion 138 of the cyclone 130, the dust, including the fines, separated in the upper portion 136 of the cyclone 130 and falling down into the lower portion 138 of the cyclone 130, is efficiently mixed with the powder supplied to the lower portion 138 of the cyclone 130 via the intermediate duct 142. The cyclone 130 in this example thereby acts both as a dust separating means and a means for returning the separated fines to the powder. It is, however, also possible to use separate means for returning the separated fines into the powder, for example any of the means 26 for returning the separated fines to the powder described hereinbefore with reference to FIG. 1.

In the fluidized bed in the lower portion 138 of the cyclone 130, the secondary alumina will be homogenized with regard to particle sizes, such that any coarse lumps will remain mixed in the alumina flow.

From the lower portion 138 of the cyclone, the fluidized, mixed, and thereby homogenized secondary alumina powder, which now once again has a restored fraction of fines, is discharged at the discharge point 120 into a silo 148, which is configured to forward the powder into alumina reduction cells (not shown).

In a preferred embodiment, each of the discharge points 120 is located in connection with a respective alumina smelting pot, and more preferred, each of the discharge points 120 is located less than 5 meters upstream its corresponding smelting pot, such that the transported powder, now being homogenized, will have little chance to segregate again before arriving at the smelting pot.

The conveyor 110 may also form a part of a larger alumina distribution system. Thanks to the homogenization of the secondary alumina at the discharge point, any trapping or accumulation of coarse alumina particles in downstream regions within the distribution system that may be unfluidized or present an altered fluidization gas flow, such as transportation duct joints or bends, will be reduced. It is also beneficial for any downstream powder feeding equipment, as well as for the efficiency of the alumina smelting process, that the secondary alumina be homogenous with respect to particle size when it enters the smelting pots.

The invention has mainly been described above with reference to a few embodiments. However, as is readily appreciated by a person skilled in the art, other embodiments than the ones disclosed above are equally possible within the scope of the invention, as defined by the appended claims.

For example, the invention is not limited to cyclones. Also other separating means, for example filters, may be used to separate the dust, including the fines, from the spent fluidization gas.

The invention can be used for transporting other pulverous substances than alumina, e.g. fly ash, metal powders, coal powder, and various gas cleaning by-products.

Furthermore, even though it is preferred, it is not necessary that the separating means be located adjacent to the discharge point; the separation may be performed elsewhere, and after the separation the fines may be conveyed to the discharge point for discharge into the powder.

The invention claimed is:

1. A conveyor for transporting powder including dust from an inlet point to at least one discharge point, the conveyor comprising:
   a fluidized bed transport duct for receiving powder including dust fed at the inlet port;
   a fluidization gas supply space for supplying fluidization gas to the fluidized bed transport duct to fluidize the powder in the fluidized bed transport duct for transporting the powder to the at least one discharge point downstream of the fluidized bed transport duct;
   a gas outlet transport duct bypass for removing fluidization gas from the fluidized bed transport duct;
   means for separating dust from the removed fluidization gas in the gas outlet transport duct bypass, the means for separating dust including an inlet for receiving dust laden gas, a first outlet for collecting the dust from the dust laden gas, and a second outlet for collecting de-dusted gas having the dust separated therefrom; and
   means for merging the separated dust with the fluidized power by the first outlet which is arranged proximate the discharge point,
   wherein the means for separating dust mixes the separated dust back into the powder in a mixing region in a lower portion of the means for separating dust.

2. A conveyor according to claim 1, wherein said means for separating dust from the removed fluidization gas comprises a cyclone, said cyclone including:
   an inlet for dust laden gas;
   a first outlet for dust; and
   a second outlet for de-dusted gas,
   wherein said inlet for dust laden gas is connected to said transport duct.

3. A conveyor according to claim 2, wherein said inlet for dust laden gas is connected to said transport duct adjacent to the discharge point.

4. A conveyor according to claim 2, wherein a lower portion of the cyclone communicates with the transport duct, so as to allow a transfer of powder between the transport duct and the cyclone.

5. A conveyor according to claim 4, wherein said cyclone comprises a gas permeable wall, which separates the cyclone from a fluidization gas supply space, so as to allow fluidization of powder in said cyclone.

6. A conveyor according to claim 4, wherein said transport duct is connected to the discharge point via a lower portion of said cyclone.

* * * * *